United States Patent [19]
Alix et al.

[11] Patent Number: 6,132,692
[45] Date of Patent: *Oct. 17, 2000

[54] BARRIER DISCHARGE CONVERSION OF $SO_2$ AND NOX TO ACIDS

[75] Inventors: Francis R. Alix, Greenland; S. Edward Neister, New Durham; Christopher R. McLarnon; Phillip D. Boyle, both of Exeter, all of N.H.

[73] Assignee: Powerspan Corp., New Durham, N.H.

[ * ] Notice: This patent is subject to a terminal disclaimer.

[21] Appl. No.: 09/251,091

[22] Filed: Feb. 16, 1999

Related U.S. Application Data

[63] Continuation-in-part of application No. 08/948,268, Oct. 9, 1997, Pat. No. 5,871,703.
[60] Provisional application No. 60/027,905, Oct. 9, 1996.
[51] Int. Cl.⁷ .............................. C25B 1/22; B01D 53/60; B01D 53/64
[52] U.S. Cl. .................. 423/210; 204/157.3; 204/174; 204/177; 423/235; 423/243.01; 423/393; 423/522
[58] Field of Search .................... 423/210, 235, 423/243.01, 393, 522; 204/157.3, 174, 177

[56] References Cited

U.S. PATENT DOCUMENTS

| | | | |
|---|---|---|---|
| 3,745,751 | 7/1973 | Zey et al. | 422/161 |
| 3,856,476 | 12/1974 | De Seversky | 422/111 |
| 3,981,815 | 9/1976 | Taniguchi et al. | 204/157.3 |
| 4,351,810 | 9/1982 | Martinez et al. | 423/235 |
| 4,650,555 | 3/1987 | Rzad et al. | 204/174 |
| 4,885,139 | 12/1989 | Sparks et al. | 422/169 |
| 4,925,639 | 5/1990 | Stauffer | 423/235 |
| 5,137,546 | 8/1992 | Steinbacher et al. | 95/71 |
| 5,147,516 | 9/1992 | Mathur et al. | 204/177 |
| 5,512,144 | 4/1996 | Stauffer | 205/554 |
| 5,601,791 | 2/1997 | Plaks et al. | 422/169 |
| 5,695,616 | 12/1997 | Helfritch et al. | 204/157.3 |
| 5,733,360 | 3/1998 | Feldman et al. | 95/78 |
| 5,871,703 | 2/1999 | Alix | 423/210 |

OTHER PUBLICATIONS

Urabe, T., et al. "Experimental Studies on Mercury Vapor Removal by Corona Discharge . . . ", Chemical Abstracts, vol. 109, #236097, Oct. 1997.

Dhali, S.K., et al. "Dielectric–barrier Discharge for Processing of SO2/NOx", Journ. App. Physics, vol. 69, pp. 6319–6324, May 1991.

McLarnon, Christopher R., "Nitrogen Oxide Decomposition by Barrier Discharge," Dissertation for Doctor of Philosophy Degree in Chemical Engineering, University of New Hampshire, May 1996.

Penetrante, Bernie M., "Effect of Electrical Parameters on the Chemical Kinetics of Plasma–Based Air Pollution Control," Applications of Electrostatics for Gas Phase Air Pollutants Workshop, Cincinnati, Ohio, Aug. 22, 1997.

Helfritch, Dennis J., "Plasma Based Technologies Applied to Air Pollution Control," Applications of Electrostatics for Gas Phase Air Pollutants Workshop, Cincinnati, Ohio, Aug. 22, 1997.

Monroe, Larry S., et al., "Testing of a Combined Dry and Wet Electrostatic Precipitator for Control of Fine Particulate Emissions from a Coal–Fired Boiler," EPRI–DOE–EPA Combined Utility Air Pollutant Control Symposium, Washington, DC, Aug. 25–29, 1997.

Chemetics International Ltd., Acid Recovery and Concentration Brochure, date unknown, Vancouver, Canada.

*Primary Examiner*—Steven P. Griffin
*Assistant Examiner*—Peter DiMauro
*Attorney, Agent, or Firm*—Phillip E. Decker

[57] ABSTRACT

A process for reducing particulate, Hg, NOx, and $SO_2$ emissions from the combustion of fossil fuel while providing the capability of producing an end product that is commercially useful comprising the steps of oxidizing Hg, NOx and $SO_2$ using a barrier discharge reactor to produce the HgO and acids $HNO_3$ and $H_2SO_4$, collecting the HgO, acids and particulates in a wet ESP, and then draining them from the wet ESP to remove them from the flue gas stream.

20 Claims, 3 Drawing Sheets

BARRIER DISCHARGE CONVERSION OF SO₂ AND NOX TO ACIDS

This application is a continuation-in-part of application Ser. No. 08/948,268, filed Oct. 9, 1997, U.S. Pat. No. 5,871,703, which claims the benefit of U.S. Provisional Application No. 60/027,905, filed Oct. 9, 1996.

BACKGROUND a. Field of the Invention

This invention relates to pollution control equipment used for reducing particulate matter, Hg, NOx, and $SO_2$ emissions from the burning of fossil fuels.

b. Description of the Related Art

Electric utilities, manufacturing plants, and industrial facilities typically burn fossil fuels like coal to produce electric power and heat for process requirements. Burning fossil fuel produces an emissions stream containing a number of noxious substances as by-products. These substances include fine particulate matter, mercury, and oxides of nitrogen and sulfur. Fine particulate matter, known as fly ash, has been shown in a recent study to contribute to the deaths of 64,000 people in the United States alone. Oxides of nitrogen, generally known as NOx, result in the formation of ground level ozone, $O_3$, which is toxic when inhaled. Oxides of sulfur, generally known as SOx, are also a problem. Both NOx and SOx compounds contribute to the formation of acid rain, which is harmful to plant life, animal life, and property. In addition, mercury is one of the most toxic substances to humans that is known.

The typical methods of reducing fly ash, Hg, NOx, and $SO_2$ emissions is by the use of an electrostatic precipitator (ESP), fabric filter bag houses, catalytic systems, or scrubbers. These devices are large and very expensive to purchase and operate. They typically require large amounts of space at the plant site to install. Altogether, these methods can increase the cost of electricity produced at an electric utility by up to fifty percent.

The typical method of reducing NOx emissions is the use of special burners to cool the combustion temperature to a point where the bonds of $N_2$ present in the combustion air are less likely to be broken. This has the disadvantage of making combustion less efficient and increases particulate emissions. Expensive chemical reduction processes using ammonia and NOx scrubbers have also been tried. Stauffer, in U.S. Pat. No. 4,925,639, that issued on May 15, 1990, disclosed a process for removing NOx from flue gas and making $HNO_3$ as a useful by-product. The process involves cyclically subjecting the gas to scrubbing with nitric acid and then electrolyzing the dissolved nitric oxide to form more nitric acid. This process has the disadvantage that it only treats one type of pollution.

The typical methods of reducing SOx emissions include burning low-sulfur coal and employing flue gas desulfurization (FGD) apparatuses inside scrubbers. Burning low-sulfur coal reduces the particulate collection efficiency of the ESP, and is much more expensive than ordinary coal. Using FGD equipment is very expensive to build and maintain.

A few have tried to remove multiple pollutants from a flue gas stream. Plaks et al., in U.S. Pat. No. 5,601,791, that issued on Feb. 11, 1997, discloses a process and apparatus that neutralizes "acid gases" such as SOx inside an existing ESP. Plaks et al. spray a neutralizing agent upstream from the ESP collecting plates to collect particulates, neutral salts, and unreacted neutralizing agent. The material collected on the plates is then washed using a spray in the manner of a wet ESP. This process and apparatus does not purposefully create and collect the acids, which are valuable industrial materials. Instead, the resulting effluent is sent to a landfill for disposal.

Sparks et al., in U.S. Pat. No. 4,885,139, that issued on Dec. 5, 1989, discloses a method for removing SOx and other "acid gases" from flue gas by a multistage ESP within a single housing. In that method, a neutralizing agent is sprayed upstream from the ESP collecting plates, forming neutral salts which dry before being collected by the plates. In this manner SOx and particulates are removed from the flue gas. However, like Plaks et al., no effort is made to form $H_2SO_4$ from the SOx, and the effluent must be sent to a landfill for disposal. Nor do either of them refer to the removal of NOx or the formation of $HNO_3$ in this manner.

The deleterious health effects of these noxious pollutants become better understood as more medical research is completed. As a result, environmental regulations worldwide are being made more stringent. When the environmental regulations become more stringent, the cost of compliance increases. More expensive pollution control equipment must be purchased and maintained which does not provide any monetary return to the owner.

While environmental compliance costs continue to rise, there is a movement toward consolidating ownership of power plants world-wide and increasing competition. As a result, capital expense budgets are often slashed in an effort to keep the cost of producing electricity low. A pollution control process and apparatus that has the ability to provide a monetary return to the owner while reducing particulate, Hg, NOx, and $SO_2$ emissions would solve several serious problems at the same time.

To date, a limited number of plants have been able to sell fly ash commercially. Of the gases, only $SO_2$ has been converted to useful products that can provide a monetary return. It has been used in the manufacture of gypsum and in the recovery of elemental sulfur. Also, dilute acids have been manufactured from exhaust gases by catalytic reactions. These methods are limited, and are not widely used.

For the foregoing reasons, there is a need for a single process for reducing particulate, Hg, NOx, and $SO_2$ emissions from flue gas that has the capability of producing an end product that is commercially useful while eliminating the need to dispose of an environmentally undesirable by-product.

SUMMARY

The present invention is directed to a process and apparatus that satisfies this need. A process that reduces particulate, Hg, NOx, and $SO_2$ emissions comprises the steps of oxidizing Hg, NOx, and $SO_2$ in a flue gas stream to HgO, $HNO_3$, and $H_2SO_4$, respectively, using a barrier discharge reactor; collecting particulate emissions, HgO, $NO_2$, $SO_2$, $HNO_3$, and $H_2SO_4$ in a wet electrostatic precipitator, forming a mixture; and draining the mixture from the wet electrostatic precipitator. The reactor and wet ESP are preferably installed inside an existing ESP casing to conserve land space. These and other features, aspects, and advantages of the present invention will become better understood with reference to the following drawing and description.

DESCRIPTION

The present invention is a process for reducing particulate, Hg, NOx, and $SO_2$ emissions from the combustion of fossil fuels that provides the ability to produce commercially valuable acids as reaction products. Throughout this specification, NOx is intended to include, but not be limited to, NO and $NO_2$.

Figure 1:
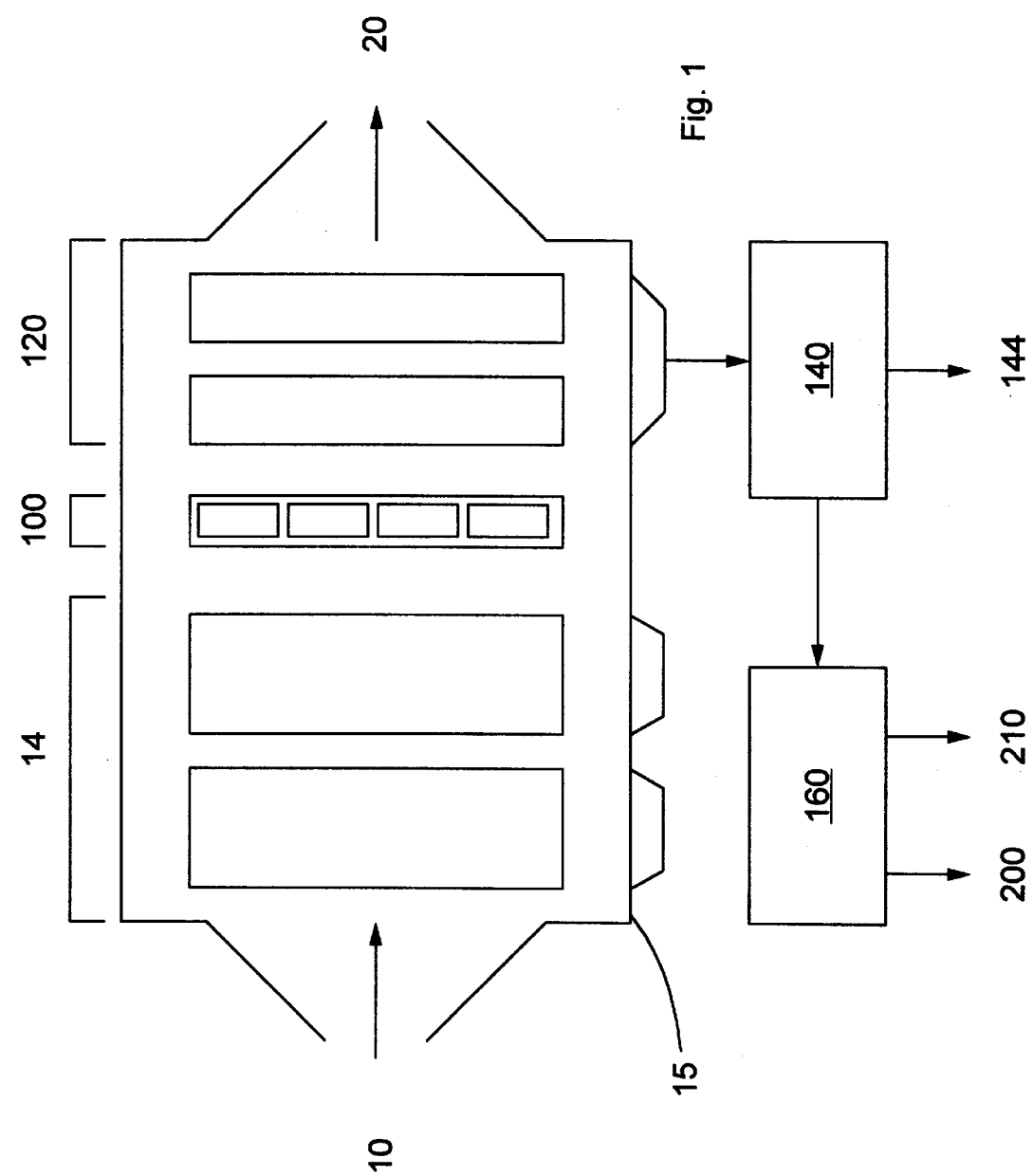
FIG. 1 is a cut-away view of an ESP casing with the dry ESP, reactor, and wet ESP inside, with the separating and processing apparatuses shown in block diagram form.

Turning to FIG. 1, flue gas 10 is created by the combustion of fossil fuel in a boiler. Fuels that are typically used in electric utilities and manufacturing plants include coal and oil, but may comprise other substances like gas, tires, trash, or biomass. Flue gas emissions 10 enter a electrostatic precipitator casing (ESP) 15. A standard dry ESP 14 is provided that typically removes approximately 90% of the particulate ash.

In practice, it is anticipated that the present invention is likely to be retrofitted into existing ESP's. The last fields of the existing dry ESP are removed to make room for a barrier discharge reactor 100 and wet ESP 120. "Barrier discharge" is also known as silent, and non-thermal plasma discharge. It is not the same as corona or electron beam discharge. The reactor 100 converts a portion of the Hg, NOx and $SO_2$ present in the flue gas to HgO, $HNO_3$ and $H_2SO_4$. The acids, HgO, and most of the fine particles not collected by the dry ESP 14 are collected in the wet ESP 120. The wet ESP 120 also collects $NO_2$ and $SO_2$ gas. Having had most of the Hg, NOx, $SO_2$, and particulate matter removed, the flue gas exits the precipitator 20 with greatly reduced amounts of Hg, NOx and $SO_2$, and almost no particles. As an alternative to the preferred embodiment, the reactor 100 and wet ESP 120 can be installed outside the existing ESP casing 15. Yet another alternative is to follow the reactor 100 and wet ESP 120 sections with an additional converter and wet ESP section, either inside or outside the ESP casing 15, in order to obtain a desired conversion efficiency. The reactor 100 and wet ESP 120 can be thought of as stages, and any number of stages can be provided to reduce emissions to their desired levels.

The effluent from the wet ESP 120 is collected as a mixture and travels to an optional separator apparatus 140, where the particulates 144 are removed. The separator apparatus may comprise a settling tank, a filter, a centrifuge, or any combination of the three as is commonly practiced in the art.

The remaining mixture travels to an optional processing apparatus 160. One embodiment of processor separates the $HNO_3$ and $H_2SO_4$, and concentrates them for industrial use. The result is concentrated $H_2SO_4$ 200 and concentrated $HNO_3$ 210. Another processor 160 would be an acid neutralization plant, or other chemical processing means. The acids can also be reused in the wet ESP or in a packed bed scrubber.

The choice of whether to employ the separating and processing steps depends on the economics at an individual plant location. Acid prices vary from region to region, and there may be some regions in which it is more economical to dispose of the acid products instead of refining them for industrial use, thereby providing a cash stream from the effluent.

Figure 2:
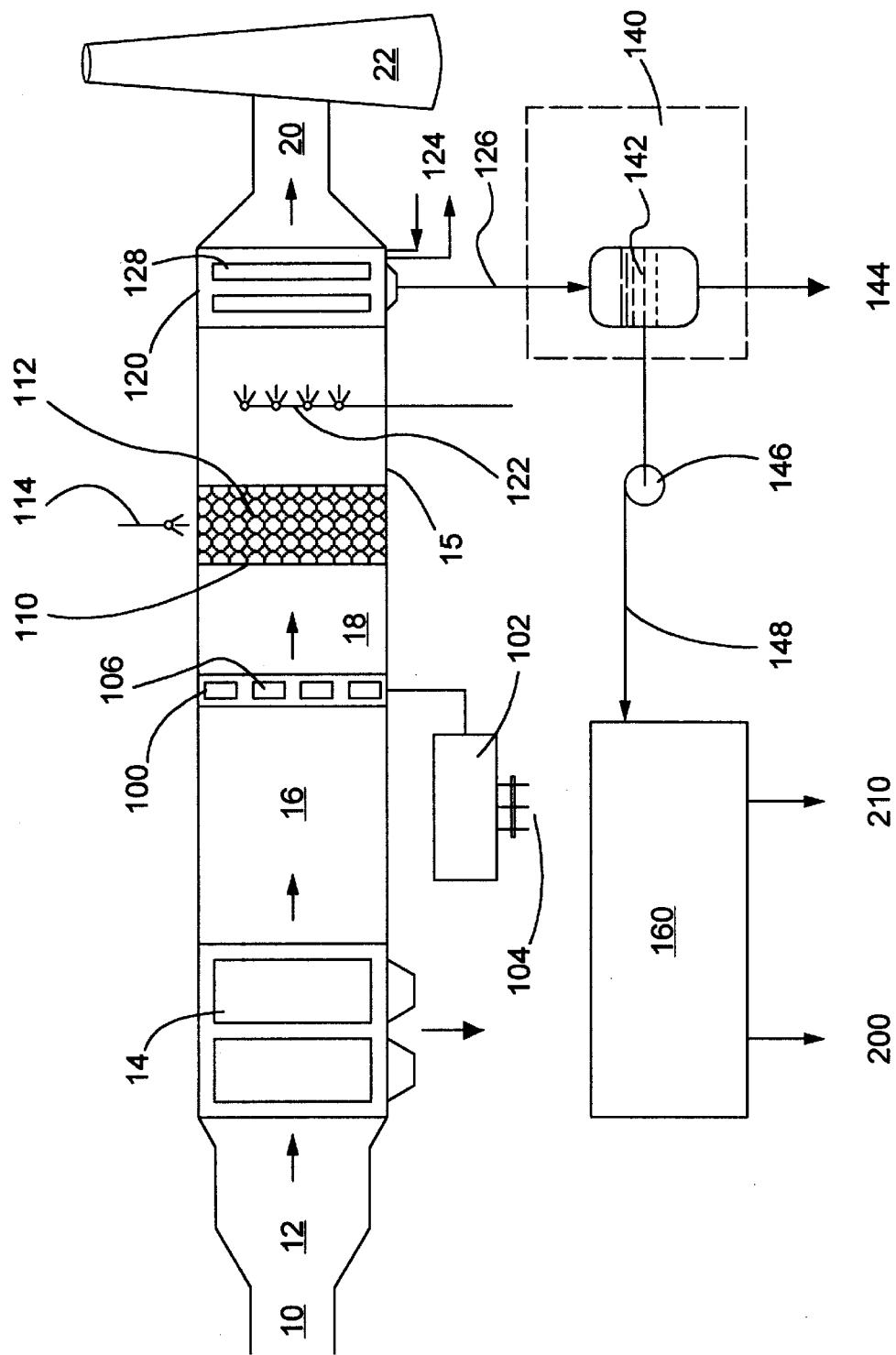
FIG. 2 is a cut-away view like in FIG. 1 but showing an optional packed bed scrubber between the reactor and wet ESP.

Turning to FIG. 2, the composition of the flue gas 12 before the dry ESP 14 is primarily particulate ash, $N_2$, $CO_2$, $H_2O$, $O_2$, $SO_2$, NOx, Hg and other trace heavy metals. After the dry ESP 14 and before the converter apparatus 100, the composition of the flue gas 16 is primarily fine particulates on the order of 2.5 microns, $N_2$, $CO_2$, $H_2O$, $O_2$, $SO_2$, NOx, Hg and other trace heavy metals.

The barrier discharge reactor 100 in the preferred embodiment is a coaxial tube-style reactor, where a conductive tube is one electrode, a center electrode is secured inside along the longitudinal axis, and a dielectric material is disposed between them within the tube. The tubes can be arranged in tube bundles 106, here shown as four bundles high within the ESP casing 15. The actual number of bundles 106 arranged high and across are engineering decisions within the capability of those having skill in the art, and is shown here as four as an example only. The electrodes are energized by a power supply 102 that converts station-provided, three-phase power into high voltage alternating current power. The power supply is electrically connected to the reactor. The voltage supplied to the converter is preferably between about 15,000 and about 50,000 volts RMS at a frequency between about 50 Hz and about 10 kHz. The preferred embodiment operates at about 1 kHz. Operating at a lower frequency reduces the size and cost of the high voltage transformer required.

In using barrier electrical discharge, high voltage alternating current is applied to electrodes which are separated by a gas space and a dielectric barrier. The voltage can be applied in any one of several waveforms, including but not limited to sine, square, triangle, and pulsed voltages.

The major chemical reactions in the conversion of NOx to $HNO_3$ are as follows:

(1) $O_2+e \rightarrow O+O+e$ (2) $H_2O+e \rightarrow OH+H+e$ (3) $NO+O \rightarrow NO_2$ (4) $NO_2+O \rightarrow NO_3$ (5) $NO_2+OH \rightarrow HNO_3$ (6) $NO_3+NO_2 \rightarrow N_2O_5$ (7) $N_2O_5+H_2O \rightarrow 2\ HNO_3$ The major chemical reactions in the conversion of SOx to $H_2SO_4$ are as follows:

(1) $SO_2+O \rightarrow SO_3$ (2) $SO_2+OH \rightarrow HSO_3$ (3) $HSO_3+OH \rightarrow H_2SO_4$ (4) $SO_2+HO_2 \rightarrow HSO_4 \rightarrow H_2SO_4$ (5) $SO_3+H_2O \rightarrow H_2SO_4$ The composition of the flue gas 18 after the converter but before the wet ESP 120 is primarily fine particulates, $N_2$, $CO_2$, $H_2O$, $O_2$, 75% of the original $SO_2$, 25% of the original NOx (predominantly in the form of $NO_2$), HgO, $H_2SO_4$ and $HNO_3$. Note that the reactor 100 converted Hg present in the flue gas to HgO that is readily collected in the wet ESP 120.

An optional packed bed scrubber 110 can be provided between the reactor 100 and wet ESP 120. Packing 112 is held in place by a grid, screen or other structure that allows flue gas to pass through and holds the packing. The packing 112 is charged with a concentrated acid spray 114 shown coming from the top, but can be from the sides. Preferably, the acid is about 70% sulfuric acid and less than 5% nitric acid. However, the nitric acid should be less than 10%. The acids used may be the products of the acid processing step. The selection of packing material and geometry is within the ability of one having skill in the chemical engineering art.

An evaporative cooling water spray injection apparatus 122 sprays water into the flue gas just before it reaches the wet ESP 120. Like the dry ESP 14, the wet ESP 120 comprises a plurality of plates 128. In the preferred embodiment, the plates are subcooled below the saturation temperature of the flue gas, for example, by the use of cooling water 124 provided at the station. In this manner the acids in the composition of the flue gas 18 tends to condense on the surfaces of the wet ESP plates 128. Very little of the acids in the composition 18 exits the ESP 20 and goes into the environment through the stack 22.

The effluent from the wet ESP 126 is primarily a slurry or mostly-liquid mixture of dilute $H_2SO_4$, dilute $HNO_3$, scrubbed $SO_2$, fine particles, and HgO. It travels to a separation apparatus 140. The mixture is separated by a settling tank, centrifuge, or filter 142. The resulting solids 144 are removed and safely disposed of. The remaining dilute acids 148 are transported by an optional pump 146 to a processing apparatus 160. One embodiment of a processing apparatus 160 separates the acids and concentrates them to produce $HNO_3$ 200 and $H_2SO_4$ 210. Another processing apparatus my neutralize the acids for disposal. Still others may perform other desired chemical reactions.

Figure 3:
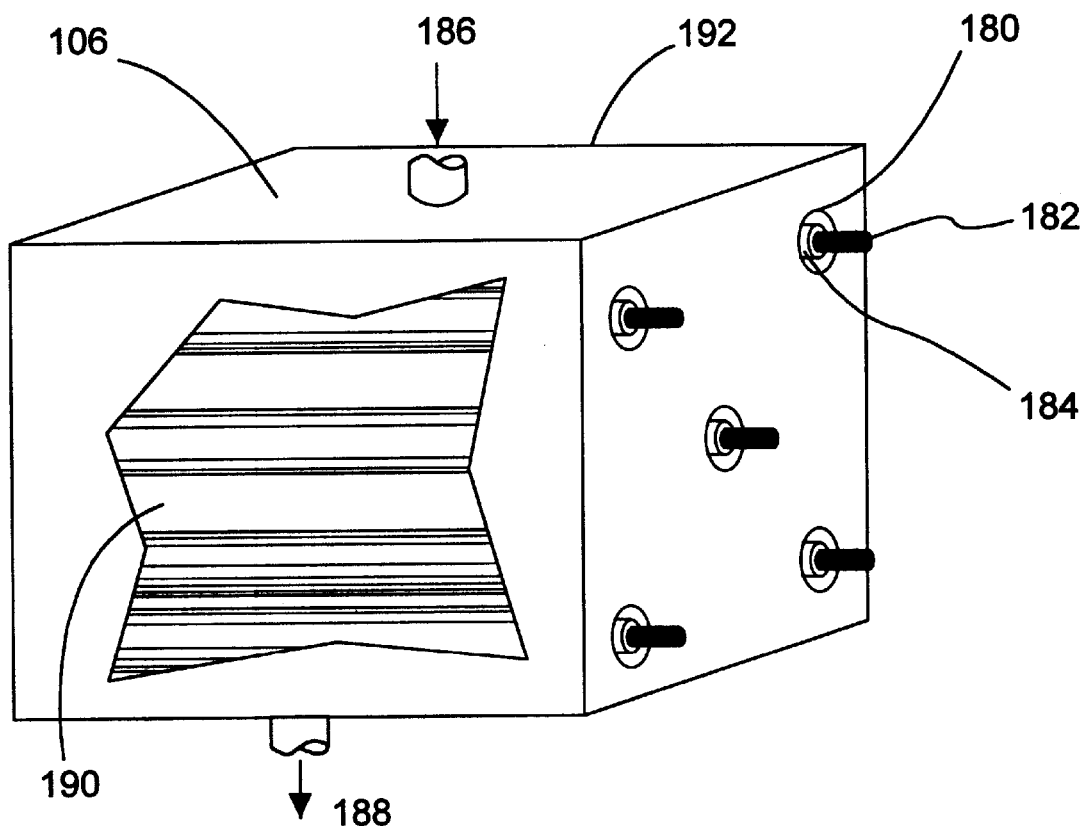
FIG. 3 shows an externally cooled reactor with details of a tube bundle.

FIG. 3 shows one embodiment of a tube bundle 106 of coaxial reactors. A plurality of coaxial electrode tubes 180 are secured in a spaced relationship to each other using preferably a rectangular structure 192. The tubes are preferably made of 1¼ inch diameter stainless steel tube, but other sizes and materials may be used. Wire electrodes 182 are secured inside the coaxial electrodes along the longitudinal axes of the tubes. Some tubes may not be provided with wire electrodes. Although the term "wire" is used, these electrodes can be rods, or other shaped material smaller than the inside diameter of the tubes. The material does not necessarily have to be smooth like a wire, but is preferably made of stainless steel.

The bundle 106 is arranged so that flue gas flows substantially horizontally through the reactor 100. In this way, pressure drop across the reactor is minimized. The bundles may also slant slightly downhill from the upstream side to prevent ash accumulation. Sonic horns, vibrators, or rappers can also be employed for preventing ash buildup in the reactor. Although the reactor tubes are preferably horizontal, which is parallel to flue gas flow, the tubes can also be secured vertically within the casing 15.

An externally cooled reactor 100 is shown in FIG. 3. A cooling fluid 190 enters the support structure 192. Heat generated by the barrier discharge reaction passes through the tubular electrode 180 walls to the fluid 190. The chemical reactions that take place in the reactor vary according to the temperature. It has been found to be advantageous to maintain a reactor temperature greater than about 300 degrees Fahrenheit. The reactor can also be effectively operated at higher or lower temperatures, however. The heat transfer fluid 190 can be oil, water, air, or other heat transfer medium that is known in the art.

The heat recovered from the reactor can be dissipated to the environment, or it can recovered for use in other processes at the plant. The heat can be used to increase the efficiency of an acid processing and concentration apparatus 160. It can also be used to pre-heat the air going into the combustion chamber of the plant to increase its efficiency.

Figure 4:
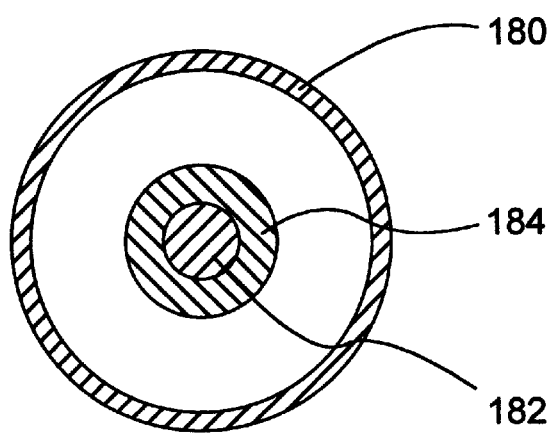
FIG. 4 is a cross section of a coaxial tube electrode with a wire electrode and dielectric material secured within.

FIG. 4 is a cross section of a coaxial tube electrode 180. The wire electrode 182 is secured in the middle along the tubes longitudinal axis. Surrounding the wire electrode is a dielectric barrier material 184 necessary for initiating and sustaining a barrier discharge. In the preferred embodiment, it is a hollow cylinder of quartz or alumina. Preferred sizes are cylinders having a 3 mm inside diameter and 5 mm outside diameter, or 5 mm inside diameter and 8 mm outside diameter. Preferably, the outside of the wire electrode 182 is in a contacting relationship to the inside diameter of the dielectric 184.

Although flat plate electrodes have been used in barrier discharge reactors for pollution control in the past, coaxial reactors greatly improve performance of the process. Of the many benefits, it is easier to establish a barrier discharge within the whole discharge area in a coaxial reactor than a flat plate reactor. Temperature gradients between the top and bottom of a flat plate reactor often provide inhomogeneous reactions, which decrease reactor efficiency. The tops are hotter than the bottoms, and the middles are hotter than the sides in flat plate reactors. Coaxial reactors, on the other hand, tend to "light off" evenly throughout the whole tube as soon as temperature and power requirements reach the threshold for the particular reactor geometry. The reaction is very homogeneous. The result is that more gas is exposed to the barrier discharge, and more flue gas is treated.

It will be apparent to those skilled in the art that various changes and modifications can be made without departing from the spirit of the present invention. Accordingly, it is intended to encompass within the appended claims all such changes and modifications that fall within the scope of the present invention.

We claim:

1. A process for reducing particulate, Hg, NOx, and $SO_2$ emissions from a flue gas stream comprising the steps of a. oxidizing Hg, NOx and $SO_2$ in a flue gas stream to HgO, $HNO_3$ and $H_2SO_4$, respectively, using a barrier discharge reactor, said NOx comprising NO and $NO_2$;

b. collecting particulate emissions, HgO, $NO_2$, $SO_2$, $HNO_3$, and $H_2SO_4$ in a wet electrostatic precipitator, forming a mixture; and c. draining the mixture from the wet electrostatic precipitator, thereby reducing particulate, Hg, NOx, and $SO_2$ emissions from a flue gas stream.

2. The process of claim 1 further comprising the step of separating the particulate emissions and HgO from the mixture.

3. The process of claim 2 further comprising the step of processing the mixture by separating $HNO_3$ and $H_2SO_4$ from each other and concentrating $HNO_3$ and $H_2SO_4$, and thereby reducing particulate, NOx, and SOx emissions from the flue gas stream and producing acids for industrial use.

4. The process of claim 2 further comprising the step processing the mixture by neutralizing the $HNO_3$ and $H_2SO_4$.

5. The process of claim 1 further comprising the step of collecting particulate emissions with a dry electrostatic precipitator located upstream from the barrier discharge reactor.

6. The process of claim 1, said barrier discharge reactor comprising a. a plurality of coaxial tube electrodes, each having a longitudinal axis, b. at least one wire electrode secured along the longitudinal axis of at least one coaxial tube electrode, and c. a dielectric material disposed between each wire electrode and tube electrode.

7. The process of claim 6, wherein said coaxial tube electrodes are constructed of 1¼ inch diameter stainless steel tubing.

8. The process of claim 6, wherein a plurality of coaxial tube electrodes are secured in a spaced relationship to form a tube bundle.

9. The process of claim 6, wherein the dielectric material is a cylinder substantially the same length as the coaxial tube electrodes and having an inside diameter between about 3 and about 5 millimeters and an outside diameter between about 6 and about 8 millimeters.

10. The process of claim 6, wherein the wire electrode has a diameter that is in a contacting relationship with the inside diameter of the dielectric material.

11. The process of claim 6, wherein the dielectric material is quartz.

12. The process of claim 6, wherein the dielectric material is alumina.

13. The process of claim 1, wherein the barrier discharge reactor is energized by an alternating current power source at a frequency between about 50 Hz and about 10 kHz.

14. The process of claim 1, wherein the barrier discharge reactor is energized by an alternating current power source at a voltage between about 15 kV and about 50 kV RMS.

15. The process of claim 1, further comprising the step of externally cooling the barrier discharge reactor to a temperature selected for optimum oxidizing efficiency.

16. The process of claim 3, further comprising the steps of
   a. externally cooling the barrier discharge reactor to a temperature selected for optimum oxidizing efficiency, and
   b. recovering heat from the external cooling step for use in increasing the efficiency of the concentrating step.

17. The process of claim 1 further comprising the step of scrubbing $SO_2$ and $NO_2$ from the flue gas with a packed bed scrubber after oxidizing with the barrier discharge reactor and before collecting with the wet electrostatic precipitator.

18. The process of claim 17, wherein the packed bed scrubber is charged with a concentrated mixture of $HNO_3$ and $H_2SO_4$.

19. The process of claim 18, said concentrated mixture comprising an aqueous solution of about 70% $H_2SO_4$ and less than 10% $HNO_3$.

20. The process of claim 1, wherein the oxidizing, collecting, and draining steps comprise a stage for removing a portion of the Hg, NOx, and $SO_2$ emissions from a flue gas stream; said process comprising a plurality of stages sequentially arranged for removing incrementally greater portions of the Hg, NOx and $SO_2$ from the flue gas stream.

* * * * *